(12) United States Patent
Shankari et al.

(10) Patent No.: US 9,379,995 B2
(45) Date of Patent: Jun. 28, 2016

(54) RESOURCE ALLOCATION DIAGNOSIS ON DISTRIBUTED COMPUTER SYSTEMS BASED ON RESOURCE HIERARCHY

(71) Applicant: VMware, Inc., Palo Alto, CA (US)

(72) Inventors: Kalyanaraman Shankari, Mountain View, CA (US); Anne Holler, Los Altos, CA (US); Minwen Ji, Los Altos, CA (US); Sahan B. Gamage, West Lafayette, IN (US); Selvi Kadirvel, Gainesville, FL (US)

(73) Assignee: VMware, Inc., Palo Alto, CA (US)

( * ) Notice: Subject to any disclaimer, the term of this patent is extended or adjusted under 35 U.S.C. 154(b) by 342 days.

(21) Appl. No.: 14/024,570

(22) Filed: Sep. 11, 2013

(65) Prior Publication Data
US 2014/0082201 A1 Mar. 20, 2014

Related U.S. Application Data

(60) Provisional application No. 61/699,603, filed on Sep. 11, 2012.

(51) Int. Cl.
*G06F 15/173* (2006.01)
*H04L 12/911* (2013.01)
*H04L 12/24* (2006.01)

(52) U.S. Cl.
CPC ............ *H04L 47/70* (2013.01); *H04L 41/0896* (2013.01); *H04L 41/5025* (2013.01); *H04L 41/5096* (2013.01)

(58) Field of Classification Search
CPC . H04L 47/70; H04L 41/5096; H04L 41/0896; H04L 41/5025
See application file for complete search history.

(56) References Cited

U.S. PATENT DOCUMENTS

| | | | | |
|---|---|---|---|---|
| 7,894,361 B1* | 2/2011 | Bhan | ................. | H04L 41/145 370/252 |
| 8,296,251 B1* | 10/2012 | Athayde | .................. | G06F 8/60 706/45 |
| 8,423,998 B2* | 4/2013 | Isci | ....................... | G06F 9/5077 717/176 |
| 8,843,933 B1* | 9/2014 | Holler | ................ | G06F 9/45533 718/104 |
| 2011/0231696 A1* | 9/2011 | Ji | ....................... | G06F 11/1438 714/3 |
| 2014/0007093 A1* | 1/2014 | Deshpande | ......... | G06F 9/45533 718/1 |

OTHER PUBLICATIONS

Kundu, S. et al. "Modeling virtualized applications using machine learning techniques"; VEE 2012, Mar. 3, 2012.
Padala, P. et al.; "Automated control of multiple virtualized resources"; In EuroSys 2009.

(Continued)

*Primary Examiner* — Jonathan Bui

(57) ABSTRACT

A system and method for performing a resource allocation diagnosis on a distributed computer system includes obtaining a target resource allocation and a snapshot of the distributed computer system, where the snapshot includes configurations and resource usage information of at least some components of the distributed computer system, and generating a resource allocation recommendation based on the target resource allocation and the snapshot by iteratively traversing a resource hierarchy in the distributed computer system. The resource allocation recommendation specifies at least one resource configuration action or at least one capacity expansion action for the distributed computer system to meet the target resource allocation.

24 Claims, 8 Drawing Sheets

(56) References Cited

OTHER PUBLICATIONS

Rolia, J. et al.; "An automated approach for supporting application qos in shared resource pools"; In Proceedings of the 1st International Workshop on Self-Managed Systems and Services (SelfMan 2005); 2005.

Shen, Z. et al.; "Cloudscale: Elastic resource scaling for multi-tenant cloud systems"; In SoCC; 2011.

VMWARE DRS Team; "Distributed Resource Scheduler: Design, implementation and lessons learned"; VMware Technical Journal 1, 1; 2012, Mar. 2012.

VMWARE, Inc. "vsphere virtual machine administration guide ESX 4.1 ESXi 4.1 vCenter Server 4.1"; Jan. 27, 2012.

Xiong, P. et al.; "Intelligent management of virtualized resources for database systems in cloud environment"; In ICDE; 2011.

Padala, P. et al.; "Adaptive control of virtualized resources in utility computing environments"; EuroSys '07: Proceedings of the 2nd ACM SIGOPS/EuroSys European Conference on Computer Systems; 2007.

Zhu, X et al.; "Utility driven workload management using nested control design"; In Proceedings of American Control Conference (ACC); Jun. 2006.

Ji, M. et al.; "Application-Level Resource Management"; VMware engineering offsite, 2007.

Barham, P. et al.; "Xen and the art of virtualization," in ACM Symposium on Operating System Principles (SOSP '03), pp. 164-177; 2003.

XenSource, "Xen credit-based cpu scheduler," 2007, http://wiki.xensource.com/xenwiki/CreditScheduler.html.

Microsoft, Inc., "Configure memory and processors,"; http://technet.microsoft.com/en-us/library/cc742470.aspx; 2008.

Govil, K. et al.; "Cellular disco: resource management using virtual clusters on shared-memory multiprocessors," in ACM Symposium on Operating System Principles (SOSP '99), pp. 164-177; 1999.

VMware, Inc., "vSphere Resource Management Guide: ESX 4.1, ESXi 4.1, vCenter Server 4.1"; Jun. 29, 2012.

Rencuzogullari et al.; "Analyzing Resource Usage and Constraints in VC Environments"; VMware engineering offsite poster session 2007.

* cited by examiner

| Parameter | Web Servers (2) | | WS RP | | DB server | | LB Server | |
|---|---|---|---|---|---|---|---|---|
| | CPU | Memory | CPU | Memory | CPU | Memory | CPU | Memory |
| Reservation | 0MHz | 0MB | 3000MHz | 0MB | 0MHz | 1600MB | 500MHz | 0MB |
| Limit | Unlimited | 1024MB | Unlimited | unlimited | Unlimited | unlimited | Unlimited | 512MB |
| Shares | 1000 | 1000 | 1000 | 1000 | 1000 | 1000 | 1000 | 1000 |
| Allocation | 1500MHz | 1024MB | - | - | 500MHz | 1695MB | 500MHz | 353MB |

RESOURCE ALLOCATION DIAGNOSIS ON DISTRIBUTED COMPUTER SYSTEMS BASED ON RESOURCE HIERARCHY

CROSS REFERENCE TO RELATED APPLICATION

This application is entitled to the benefit of U.S. Provisional Patent Application Ser. No. 61/699,603, filed on Sep. 11, 2012, which is incorporated herein by reference.

BACKGROUND

Resource allocation techniques for distributed computer systems with resource-consuming clients, such as virtual machines (VMs), are important to ensure that the clients are operating at desired or target levels. For example, if a VM dedicated to sales is running on a host computer where CPU and memory are overextended to other VMs, that VM may not be able to process orders at an acceptable level. In such a situation, additional resources of the host computer should be allocated to the sales VM or the sales VM should be moved to another host computer that has sufficient resources so that the sales VM can run efficiently at or above the acceptable level. Cloud infrastructure as a service (IaaS), which is based on deploying workloads encapsulated in clients, such as VMs, becomes increasingly popular due to its ability to supply elastic on-demand access to computing resources. Managing resources of clients running in the cloud can be critical for the operation of the cloud IaaS. For example, cloud customers want to acquire resources sufficient to meet the performance requirements of current application workloads while cloud providers want to supply software clients with the acquired resources at low operational overhead.

Conventional resource allocation techniques make changes with respect to resource allocation in a distributed computer system by manually adjusting low-level controls, such as shares, limits, and reservations, to manage the resources allocated to VMs or other software clients. However, adjusting the low-level controls for a large number of software clients introduces operational overhead. In addition, adjusting the low-level resource controls can be a complex task, because the low-level modifications can unexpectedly impact the resources delivered to other software clients in the distributed computer system.

SUMMARY

A system and method for performing a resource allocation diagnosis on a distributed computer system includes obtaining a target resource allocation and a snapshot of the distributed computer system, where the snapshot includes configurations and resource usage information of at least some components of the distributed computer system, and generating a resource allocation recommendation based on the target resource allocation and the snapshot by iteratively traversing a resource hierarchy in the distributed computer system. The resource allocation recommendation specifies at least one resource configuration action or at least one capacity expansion action for the distributed computer system to meet the target resource allocation. Other embodiments are also described.

In one embodiment, a method for performing a resource allocation diagnosis for a distributed computer system involves obtaining a target resource allocation and a snapshot of the distributed computer system, where the snapshot includes configurations and resource usage information of at least some components of the distributed computer system, and generating a resource allocation recommendation based on the target resource allocation and the snapshot by iteratively traversing a resource hierarchy in the distributed computer system. The resource allocation recommendation specifies at least one resource configuration action or at least one capacity expansion action for the distributed computer system to meet the target resource allocation.

In one embodiment, a computer-readable storage medium containing program instructions for performing a resource allocation diagnosis on a distributed computer system, where execution of the program instructions by one or more processors causes the one or more processors to perform steps including: obtaining a target resource allocation and a snapshot of the distributed computer system, where the snapshot includes configurations and resource usage information of at least some components of the distributed computer system, and generating a resource allocation recommendation based on the target resource allocation and the snapshot by iteratively traversing a resource hierarchy in the distributed computer system. The resource allocation recommendation specifies at least one resource configuration action or at least one capacity expansion action for the distributed computer system to meet the target resource allocation.

In one embodiment, a computer system for performing a resource allocation diagnosis on a distributed computer system includes a processor and a resource allocation module operably connected to the processor. The resource allocation module is configured to obtain a target resource allocation and a snapshot of the distributed computer system, where the snapshot includes configurations and resource usage information of at least some components of the distributed computer system, and generate a resource allocation recommendation based on the target resource allocation and the snapshot by iteratively traversing a resource hierarchy in the distributed computer system. The resource allocation recommendation specifies at least one resource configuration action or at least one capacity expansion action for the distributed computer system to meet the target resource allocation.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 7 shows a table with allocation settings for a resource cluster in accordance with an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
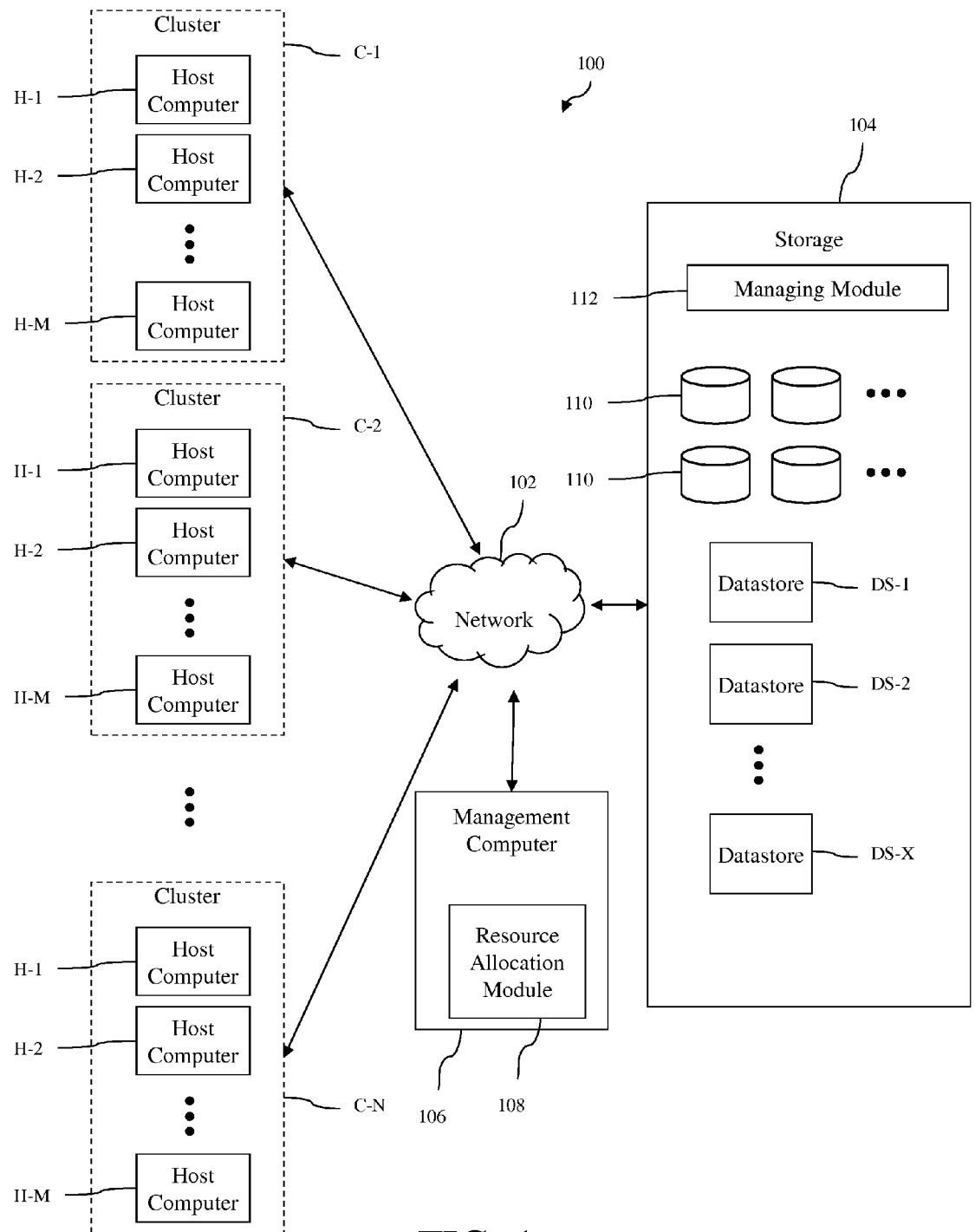
FIG. 1 is a block diagram of a distributed computer system in accordance with an embodiment of the invention.

Turning now to FIG. 1, a distributed computer system 100 in accordance with an embodiment of the invention is shown. The distributed computer system may be, for example, a computer network system. As shown in FIG. 1, the distributed computer system includes a network 102, clusters C-1, C-2 ... C-N of host computers (where N is a positive integer), storage 104 and a management computer 106 with a resource allocation module 108. The exact number of host computer clusters included in the distributed computer system can be any number of clusters from one to tens of clusters or more. The host computers of the different clusters, the storage and the management computer are connected to the network. Thus, each of the host computers in the clusters and the management computer are able to access the storage via the network and may share the resources provided by the storage. Consequently, any process running on any of the host computers and the management computer may also access the storage via the network.

In the illustrated embodiment, each of the clusters C-1, C-2 ... C-N includes a number of host computers H-1, H-2 ... H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 2:
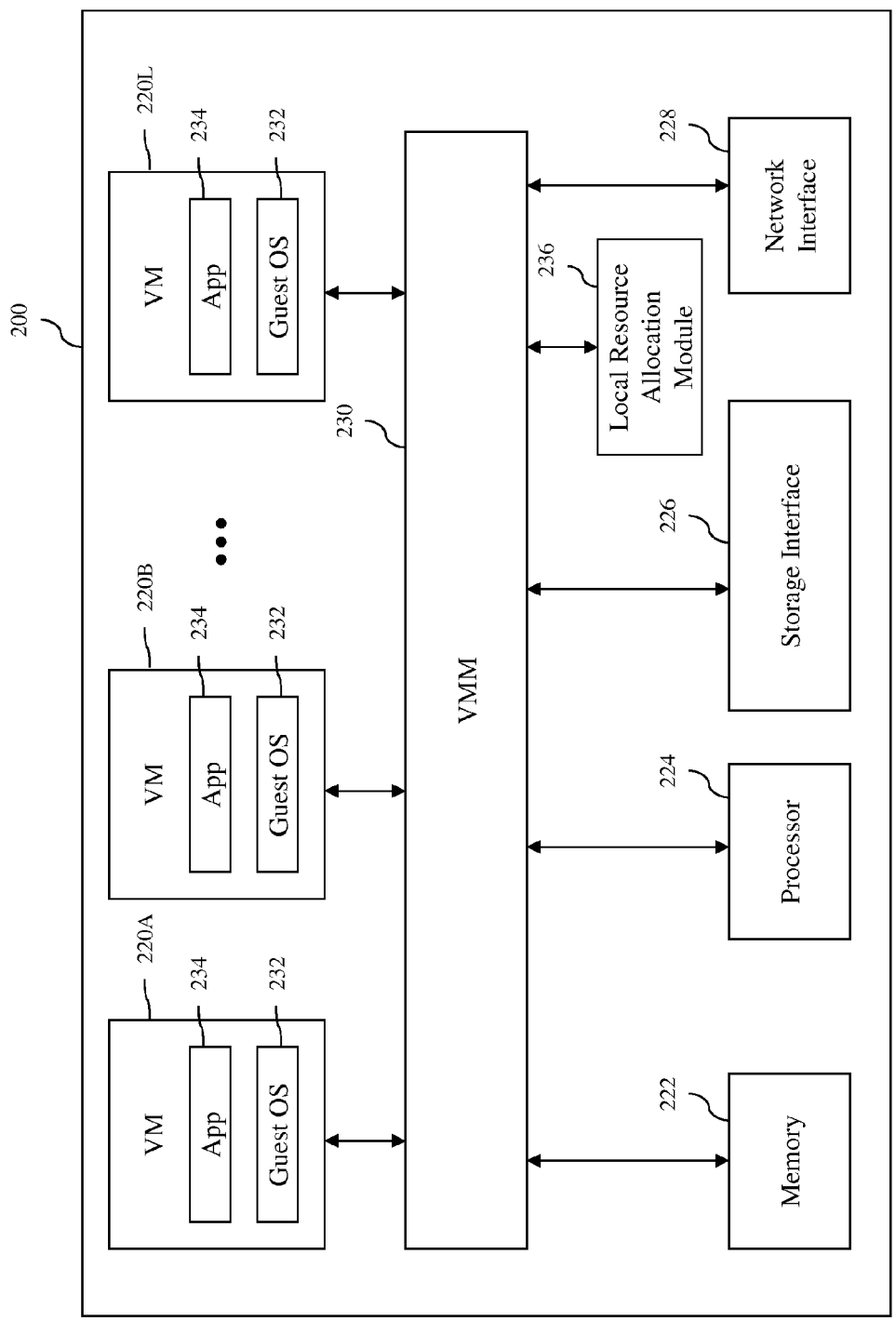
FIG. 2 is a block diagram of a host computer in accordance with an embodiment of the invention.

Turning now to FIG. 2, components of a host computer 200 that is representative of the host computers H-1, H-2 ... H-M in the clusters C-1, C-2 ... C-N in accordance with an embodiment of the invention are shown. In FIG. 2, the physical connections between the various components of the host computer are not illustrated. In the illustrated embodiment, the host computer is configured to support a number of clients 220A, 220B ... 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B ... 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system (OS) 232 and one or more guest applications (APP) 234. The guest operating system is a master control program of the respective VM and, among other things, the guest operating system forms a software platform on top of which the guest applications run.

Similar to any other computer system connected to the network 102, the VMs 220A, 220B ... 220L are able to communicate with other computer systems connected to the network using the network interface 228 of the host computer 200. In addition, the VMs are able to access the storage 104 using the storage interface 226 of the host computer.

The host computer 200 also includes a local resource allocation module 236 that operates as part of a resource management system, such as a distributed resource scheduler system, to manage resources consumed by the VMs 220A, 220B ... 220L. The local resource allocation module in each host computer cooperatively operates with the local resource allocation modules in the other host computers of the network computer system 100 to perform resource scheduling, which includes balancing the loads of software processes and/or storage resource scheduling, among the host computers H-1, H-2 ... H-M of the host computer clusters C-1, C-2 ... C-N. Although the local resource allocation module is illustrated in FIG. 2 as being separate from the virtual machine monitor 230, the local resource allocation module may be implemented as part of the virtual machine monitor. In some embodiments, the local resource allocation module is implemented as software programs running on the host computer. However, in other embodiments, the local resource allocation module may be implemented using any combination of software and hardware.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and Hyper-SCSI.

The storage 104 is used to store data for the host computers H-1, H-2 ... H-M of the clusters C-1, C-2 ... C-N, which can be accessed like any other storage device connected to computer systems. In an embodiment, the storage can be accessed by entities, such as clients (e.g., VMs) running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 ... DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The management computer 106 operates to monitor and manage the host computers H-1, H-2 ... H-M of the clusters C-1, C-2 ... C-N and/or the storage 104 of the distributed computer system 100. The management computer may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include clustering information, i.e., which host computers are included in which clusters. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients.

The management computer 106 may also be configured to monitor the current configuration of the storage 104, including the physical storage devices 110 and the datastores DS-1, DS-2 ... DS-X of the storage. The monitored storage configuration may include storage device configuration, which may include the number of storage devices in the storage, the device type of the storage devices, such as solid-state devices (SSDs) and hard disks, and storage capacity of each of the storage devices. The monitored storage configuration may also include datastore configuration, such as storage capacity of each of the datastores and connections and associations between the datastores and the host computers H-1, H-2 ... H-M and/or the clients running on the host computers.

The management computer 106 may also be configured to monitor the current usage of resources by the clients, the host computers H-1, H-2 ... H-M and the clusters C-1, C-2 ... C-N of host computers. Thus, the management computer may monitor CPU processing usage, memory usage, network usage and storage usage of the clients. The management computer may also be configured to store the usage of resources by the clients, the host computers and the clusters of host computers to maintain historical resource usage information. The historical resource usage information can then be used to develop various resource usage statistics for the individual clients, the individual host computers and the individual clusters of host computers.

The management computer 106 may also be configured to perform various operations to manage the clients, the host computers H-1, H-2 ... H-M, the clusters C-1, C-2 ... C-N of host computers and the storage 104. As an example, the management computer may be configured to initially place new clients onto one or more of the host computers in particular clusters and move existing clients to different host computers and/or different clusters. The management computer can assign software processes to the host computer clusters in a manner that balances the loads of the software processes running on the host computer clusters. Processes, such as VMs, can be balanced based on allocation policies, resource demand, and the availability of resources provided by the host computer clusters. Balancing can be applied to computer resources such as processor time, i.e., CPU cycles, memory space, network bandwidth (including any type of input/output or bus bandwidth), storage space, power consumption, cache space, software licenses, and so on. To effectively balance the computing resources, a running VM can be migrated from one host computer cluster to another, in a process that is known as live VM migration. As another example, the management computer may be configured to power down particular clients and/or host computers to conserve power. The management computer may also be configured to implement resource allocation recommendations made by the resource allocation module 108, as explained below. In order to perform these various operations, the management computer may maintain requirements and preferences for the clients with respect to the host computers and the datastores. These requirements and preferences may include affinity or anti-affinity rules for some of the clients, which may be mandatory or preferential. For example, these affinity or anti-affinity rules may include rules that specify which clients should run on the same host computer or be kept on separate host computers. As another example, these affinity or anti-affinity rules may include rules that specify which host computers are acceptable to clients and which host computers are not. The management computer may be configured or programmed to perform other operations to manage the distributed computer system 100. In an implementation, the management computer is a VMware vCenter™ server with at least some of the features available for such server.

In one embodiment, the resource allocation module 108 performs a resource allocation diagnosis to make resource allocation recommendations on the distributed computer system 100, including any initial client placement and client relocation recommendations, using a current snapshot of the distributed computer system. The resource allocation module may be periodically activated, i.e., called to run, at predefined intervals, for example, every five minutes. In addition, the resource allocation module may be activated at will when certain events or conditions occur. For example, the resource allocation module may be activated when one of the host computers is shut down for maintenance or a new VM is created in the distributed computer system 100. Alternatively, the resource allocation module may be activated manually by a user of the management computer 106.

As used herein a snapshot of a distributed computer system contains at least configuration and resource usage information of the distributed computer system at a particular moment in time. The snapshot may include the current configurations of host computers and clients running on the host computers in the distributed computer system. These configurations of the host computer and the clients may include hardware and software configurations of each host computer, clustering information, client hosting information and client information, which were described above with respect to the management computer. The snapshot may also include the current configuration of storage in the distributed computer system, including the configurations of storage devices and datastores of the storage. In addition, the snapshot may also include requirements and preferences of components in the distributed computer system. The snapshot may further include various parameters for load balancing clients in the distributed computer system. The snapshot may also include resource usage information for various components of the distributed computer system, including historical resource usage information regarding the distributed computer system. Lastly, the snapshot may also include resource allocation statistics, such as how often a client has been moved to different host computers or how often a client has consumed the entire resource allotted to that client. In an embodiment, a snapshot of a host computer cluster may include hierarchy information of the client(s) that is/are running in the cluster and/or the host computer(s) in the cluster and status information of the client(s) and/or the host computer(s). The hierarchy information may include the capacities/sizes of the clients, memory requirements of the clients, capacities of the host computers (e.g., number of processors in the host computer), or features supported in the host computers. The status information may include historical resource demand information of the clients and information of change of demand for resources of the clients.

Figure 3:
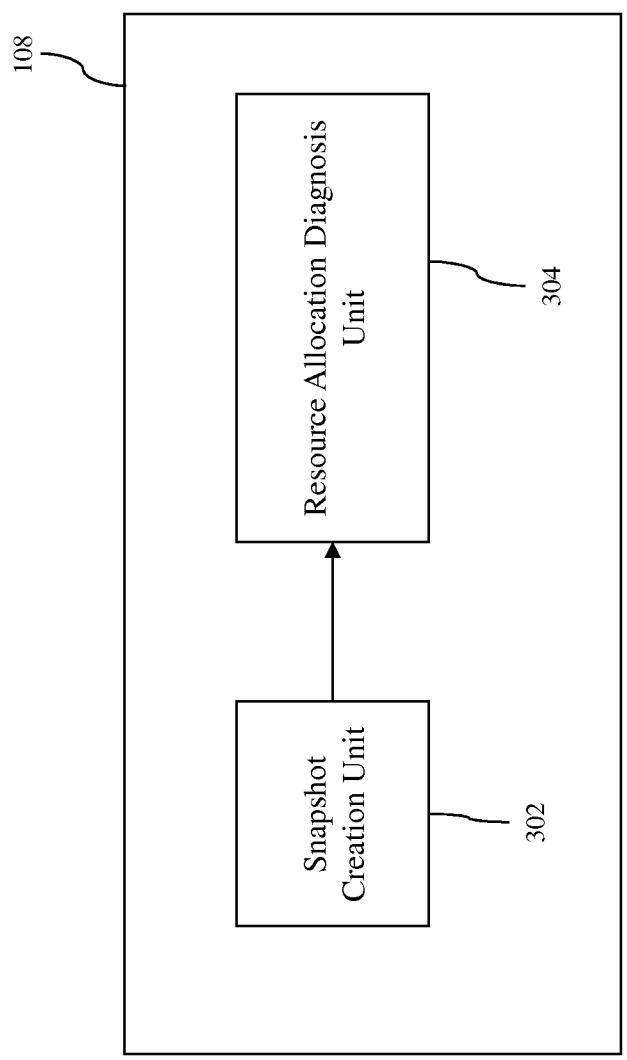
FIG. 3 is a block diagram of a resource allocation module included in a management computer of the distributed computer system in accordance with an embodiment of the invention.

Turning now to FIG. 3, a block diagram of components of the resource allocation module 108 in the management computer 106 in accordance with an embodiment of the invention is shown. As illustrated in FIG. 3, the resource allocation module 108 includes a snapshot creation unit 302 and a resource allocation diagnosis unit 304. These components of the resource allocation module can be implemented as software, hardware or a combination of software and hardware. In other embodiments, the resource allocation module may include other components found in conventional resource allocation modules. In a particular implementation, the resource allocation module is a distributed resource scheduler (DRS) installed in a VMware vCenter™ server that is executed by one or more processors of the server. However, in other embodiments, the resource allocation module may be installed in any other computer system.

The snapshot creation unit 302 operates to create a snapshot of the distributed computer system 100 using the information obtained by the resource allocation module 108. In one embodiment, a snapshot of the distributed computer system contains at least configuration and resource usage information of the distributed computer system at a particular moment in time. The snapshot creation unit interfaces with other components of the management computer 106 to obtain the information needed to generate the snapshot. In an embodiment, the snapshot is a memory object, which is produced by dumping one or more memories of the management computer. The size of the snapshot can vary, but in a particular implementation, the size of the snapshot is not larger than twenty (20) Megabytes (MB).

The resource allocation diagnosis unit 304 operates to process a snapshot of the distributed computer system 100 that is generated by the snapshot creation unit 302 using at least one resource allocation diagnosis algorithm. A resource allocation diagnosis algorithm processes the information contained in a snapshot of a distributed computer system, such as current utilizations of resources by various components in the computer network facility, and provides one or more recommendations to optimize resource allocation in the computer network facility. In addition to the recommendations, the local resource allocation diagnosis unit may also present various metrics related to resource allocation, including load balancing metrics.

In an embodiment, the results of the resource allocation diagnosis may include a resource allocation recommendation based on a target resource allocation and the snapshot. The resource allocation recommendation may specify at least one resource configuration action or at least one capacity expansion action for the distributed computer system to meet the target resource allocation. In an embodiment, the results of the resource allocation diagnosis may include a recommendation to maintain the current configurations and resource allocations, as defined in the received snapshot, i.e., a recommendation to make no changes to the current configurations and resource allocations. Alternatively, the results of the resource allocation diagnosis may include a recommendation to move one or more clients from their current host computers, as defined in the received snapshot, to other host computers and/or a recommendation to power down one or more clients or host computers, as defined in the received snapshot, to conserve power. The results of the resource allocation diagnosis may also include a recommendation to change the resource entitlement for one or more clients or host computers based at least on the current usage of a particular resource, as defined in the received snapshot. In an embodiment, at least one of the recommendations is used by the management computer 106 to automatically execute that recommendation. Alternatively, at least one of the recommendations may be presented to a user in any format, for example, on a computer monitor, so that the user can decide to follow the recommendation, ignore the recommendation or take some other action in response to the recommendation. The results of the resource allocation diagnosis may further include metrics related to resource allocation. For example, these metrics may include (a) CPU utilization with respect to percentage overcommitted per host computer or per cluster, (b) CPU ready time per client or per host computer (aggregate), (c) memory utilization with respect to percentage overcommitted per host computer or per cluster, (d) memory access latency per client or per host computer, (e) balance metric per cluster, (f) average and peak numbers of clients per host computer, (g) power consumed per host computer or per cluster (aggregate or average), (h) storage latency per host computer or per datastore, (i) storage queue depth per host computer, (j) percentage of time storage is enabled, (k) space usage per virtual disk, per datastore or per storage pod, (l) space usage with respect to percentage thin provisioned, (m) latency per datastore or per storage pod, (n) throughput per datastore or per storage pod, (o) host-datastore connectivity percentage, (p) input/output load balancing (enabled or not), (q) average and peak numbers of virtual disks per datastore, (r) number of network ports used or free per client or per host computer, (s) chargeback with respect to current charges, and (t) imbalance metrics of each of the clusters C-1, C-2 . . . C-N and/or the entire distributed computer system 100.

Figure 4:
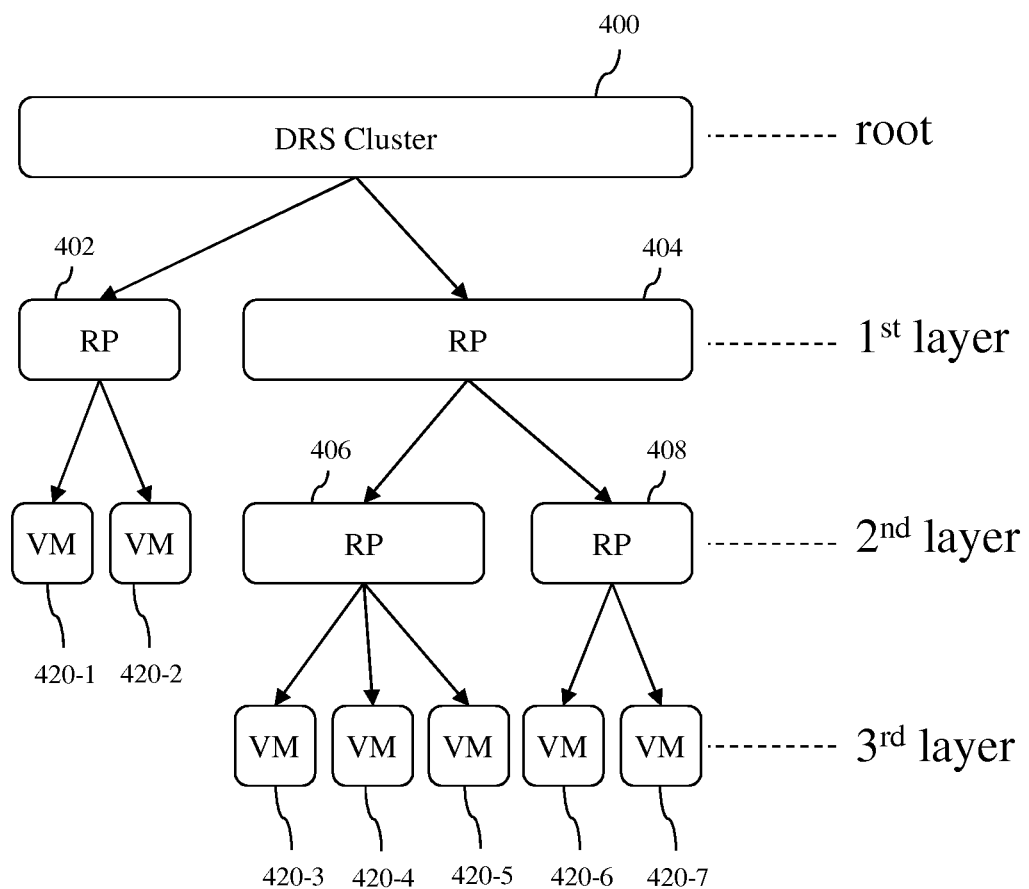
FIG. 4 depicts a hierarchical organization of a virtualized computing environment, according to one embodiment of the invention.

In an embodiment, the aggregated resources of the distributed computer system 100 can be partitioned in a hierarchical fashion using a resource pool (RP) abstraction. Partitioning the resources using the RP abstraction allows service providers (e.g., cloud providers) to group related clients (e.g., VMs) and provide performance isolation among resource groups. For example, resources in a company can be grouped in a resource cluster and each department in the company can be assigned its own resource pool in order to guarantee that one department does not consume all the resources available in the resource cluster. FIG. 4 depicts a hierarchical organization of a virtualized computing environment, according to one embodiment of the invention. As illustrated in FIG. 4, a resource cluster 400 is at the root of the hierarchy. The resource cluster includes hierarchical organized RPs 402, 404, 406, 408 and VMs 420. In particular, the resources available in the resource cluster are divided into RPs 402, 404, which are located in a first layer that is directly underneath the resource cluster 400. The resources in RP 402 are shared by VMs 420-1, 420-2, which are located in a second layer that is underneath the first layer. The resources in RP 404 are shared by RPs 406, 408, which are located in the second layer. The resources in the RP 406 are shared by VMs 420-3, 420-4, 420-5, which are located in a third layer that is underneath the second layer. The resources in RP 408 are shared by VMs 420-6, 420-7, which are located in the third layer.

Resources allocated to VMs or RPs can be controlled by adjusting resource control settings, which may include reservation, limit and shares parameters. In one embodiment, a reservation is the minimum amount of physical resources guaranteed to be available to a VM or a RP even when the resources in the cluster are over-committed. A reservation can be expressed in absolute units, e.g., MHz for CPU reservations and MB for memory reservations. In one embodiment, a limit specifies the upper bound of the resources that can be allocated to a VM or a RP. In one embodiment, a limit is honored even when there are idle resources. As with reservations, limits can be specified in absolute units. In one embodiment, shares specify the relative priority of a VM or a RP in the cluster. Shares are sometimes also referred to as weights. Unlike reservations and limits, shares can be specified in relative terms. The shares values assigned to VMs or RPs can be used to determine how the excess resources are divided among the VMs and RPs when there is contention in the distributed computer system 100. The resource control settings for reservation, limit and shares are also referred to as RLS settings. In addition to the RLS settings, each resource allocated to a VM may have a size parameter. In one embodiment, the size parameter of CPU may be the number of virtual CPU (vCPUs) allocated for that VM and the size parameter of memory may be the size of the memory advertised to the guest operating system (OS).

Manually setting the RLS settings is a complicated task, especially if elasticity is required. For example, a service provider may want to increase the resources allocated to a particular VM to improve the performance of an application running on the particular VM. However, manually increasing the reservation to satisfy the requirement might increase operation complexity and potentially violate overall system policies. In addition, manually increasing shares is difficult because it may be not clear by how much the shares should be increased. Further, some limits specified in the hierarchy might go unnoticed, resulting in lower allocations than expected even after adjusting shares.

In one embodiment, input information received by the resource allocation diagnosis algorithm used by the resource allocation diagnosis unit 304 includes current configuration of a cluster of clients (e.g., VMs) in terms of RLS settings, cluster capacity, current resource entitlement of each of the clients and a target allocation of a particular client. In one embodiment, the output of the resource allocation diagnosis algorithm is a set of recommendations on setting at least one RLS setting or at least one size parameter to achieve target resource allocation for a particular client (e.g., VM).

In one embodiment, the resource allocation diagnosis algorithm used by the resource allocation diagnosis unit 304 prefers solutions that impact only close relatives (e.g., siblings or parents) of a particular client/RP to be managed as opposed to siblings of the parent RP of the particular client/RP, which may be other clients (e.g., VMs) or RPs. Recommendations that potentially decrease resource allocations thus can impact only close relatives of a particular client/RP. Actions on siblings of the parent RP of a particular client/RP are not preferred, because these clients or RPs are under possibly different administrative domains and their resource requirements, constraints and performance requirements may be unknown. The preference for close relatives of a particular client/RP over siblings of the parent RP of the particular client/RP can support existing resource isolation between different RPs. In one embodiment, the resource allocation diagnosis algorithm prefers changing the shares parameter over changing the reservation parameter to optimize resource utilization. One reason for changing shares over changing reservations is that changing reservations can reduce flexibility to respond to spikes. Specifically, increasing (or decreasing) reservations of a client or a RP reduces (or improves) the ability of sibling VMs or RPs of the client or the RP to respond to spikes. In one embodiment, if a client's resource allocation is limited by its size or limit value, the resource allocation diagnosis algorithm may generate a solution that includes relaxing the size restriction or limit restriction. In one embodiment, removing the limit designated for a software client is preferred over changing the size designated for a client (e.g., VM) because increasing the size without restarting the client requires hotplug (i.e., changing a parameter of the client without restarting the client), and not all guest operating system (OS) support hotplug. In one embodiment, the resource allocation diagnosis algorithm uses increasing the capacity of the cluster as a last option because increasing the capacity of the cluster by adding physical CPUs, memory or hosts may be harder for a user to implement than adjusting resource settings.

The resource allocation diagnosis algorithm used by the resource allocation diagnosis unit 304 can alleviate the operational expense of generating resource settings as virtualization technologies mature and resource controls and hierarchies get increasingly sophisticated. The resource allocation diagnosis algorithm can be used to convert absolute resource requirements for a VM into a set of recommendations to reach a specified resource allocation target. In one embodiment, the resource allocation diagnosis algorithm uses an iterative greedy approach to find a solution that is in accordance with the current system configuration as well as user specified constraints. In one embodiment, the resource allocation diagnosis algorithm can be invoked to use the current resource demand of a VM as the resource allocation goal and to provide automated resource control response to demand clipping when the VM's entitled resources are less than the current CPU or memory demand. In one embodiment, if a VM's demand is not being clipped but its application performance is not meeting the service-level agreement (SLA) for its input workload, the resource allocation goal can be set to the resources recommended to handle that workload, and the resource allocation diagnosis algorithm can be invoked to recommend a reconfiguration of the VM to add memory or virtual CPUs (vCPUs). If a VM's resource demands have been growing at a rate of X percent per day, the VM's resource allocation goal could be set to the expected demand after N days to allow a service provider to do capacity planning for its projected load.

One possible embodiment of the resource allocation diagnosis algorithm used by the resource allocation diagnosis unit 304 is described with reference to the following pseudo code. However, the resource allocation diagnosis algorithm used by the resource allocation diagnosis unit 304 may be implemented with different codes.

```
Input: Snapshot of the cluster configuration, Required Allocations,
Restricted Actions, and VM ID
Output: Set of recommendations on setting RLS settings and size, (Recs)
procedure DRMDIAGNOSE
 1  for all Resource types in cluster do
 2    rsc ← Current Resource
 3    Recs[rsc] ← 0; Recommendation list
 4    Rsc_Limit ← Snapshot[VM_ID][rsc].Limit
 5    if Rsc_Limit < Required_Alloc[rsc] then
 6      if AdjustLimit(rsc, Rsc_Limit) = = false then
 7        Continue to next resource
 8    Rsc_Size ← Snapshot[VM ID][rsc].Size
 9    if Rsc Size < Required_Alloc[rsc] then
10      if Increase_Size ∈ Restricted_Actions then
11        Recs[rsc] ← 0;
12        Add a fault
13        Continue to next resource
14      S ← Required_Alloc[rsc] – Rsc Size
15      Recs[rsc] ← Recs[rsc] ∪ {Increase rsc.Size by S}
16    New_Recs ← true
17    while New_Recs do
18      LastRecsSize ← Recs[rsc].size
19      CurNode ← Snapshot[VM_ID]
20      if Cur_Alloc[rsc] ≥ Required_Alloc[rsc] then
21        Continue to next resource
22      AdjustShares(rsc, CurNode)
23      AdjustReservations(rsc, CurNode)
24      for Each parent in RP hierarchy do
25        CurNode ← CurNode.parent
26        if AdjustLimit(rsc, Rsc_Limit) = = false then
27          Continue to next resource
28        AdjustShares(rsc, CurNode)
29        AdjustReservations(rsc, CurNode)
30      if Recs[rsc].size = = LastRecsSize then
31        New Recs = false
32      Recalculate resource entitlement
33    if Cur_Alloc[rsc] < Required_Alloc[rsc] then
34      Recs[rsc] ← Recs[rsc] ∪ {Increase Cluster Capacity}
procedure ADJUSTLIMIT(rsc, Rsc Limit)

1  if Increase_Limit ∈ Restricted_Actions then
 2    Recs[rsc] ← 0;
 3    Add a fault
 4    return false
 5  L ← Required_Alloc[rsc] – Rsc_Limit
 6  Recs[rsc] ← Recs[rsc] ∪ {Increase rsc.Limit by L}
 7  return true
procedure ADJUSTSHARES(rsc, CurNode)

1  if Increase_Shares ∈ Restricted_Actions then
 2    return
 3  r = Σ siblingsofCurNode {rsc: Reservations}
 4  e = CurNode.parent[rsc].Limit – (CurNode[rsc].Reservation + r)
 5  s = Required_Alloc[rsc]/CurNode.parent[rsc].Entitlement
 6  if e > 0 then
 7    /* Calculate shares increment such that
 8    CurNode[rsc].allocation ← CurNode[rsc].allocation + e */
```

$$L = \frac{\left(\sum CurNode.parent.children[rsc].Shares * s\right) - CurNode[rsc].Shares}{(1 - s)}$$

```
10    Recs[rsc] ← Recs[rsc] ∪ {Increase rsc.Shares by L}
procedure ADJUSTRESERVATIONS(rsc, CurNode)

1  if Increase_Reservation ∈ Restricted_Actions then
 2    return
 3  if Cur_Alloc[rsc] ≤ Required_Alloc[rsc] then
 4    r = Σ siblingsofCurNode {rsc: Reservations}
 5    e = CurNode.parent[rsc].Limit – (CurNode[rsc].Reservation + r)
 6    delta = Required_Alloc[rsc] – CurNode[rsc].allocation
 7    if e > 0 and delta < e then
 8      Recs[rsc] ← Recs[rsc] ∪ {Increase rsc.Reservation by delta}
```

Figure 5:
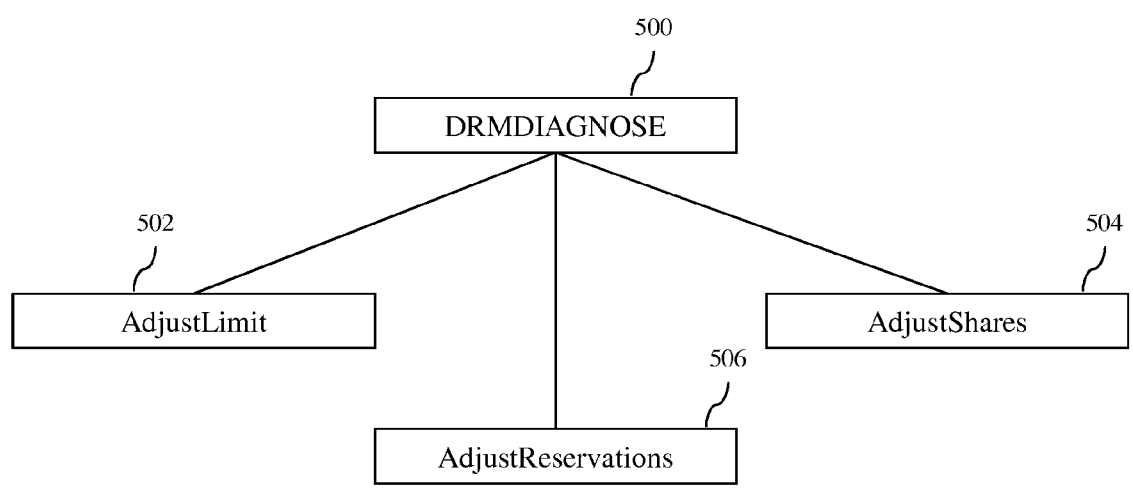
FIG. 5 depicts an algorithm performed by a resource allocation diagnosis unit of the resource allocation module of FIG. 3, according to one embodiment of the invention.

The resource allocation diagnosis algorithm assumes that the current resource allocation for the resource cluster is less than the requested allocation. The resource allocation diagnosis algorithm iterates for all the resources in a resource cluster. First, the resource allocation diagnosis algorithm checks each VM to see whether the resource constraint is created by its size or limit. If the resource constraint is created by the size or the limit of a VM, the resource allocation diagnosis algorithm adds recommendations on adjusting size and limit parameters for the VM. Once the size and limit parameters for the VM are properly adjusted, the resource allocation diagnosis algorithm traverses the resource hierarchy, starting from the bottom VM layer, adjusting shares, limits and reservations of each layer. The share, limit and reservation adjusting process is repeated until the requested allocation has been achieved or new recommendations cannot be made. Specifically, as shown in FIG. 5, the resource allocation diagnosis algorithm includes a main procedure named "DRMDIAGNOSE" 500, a procedure named "AdjustLimit" 502 for adjusting limit parameters, a procedure named "AdjustShares" 504 for adjusting shares parameters, and a procedure named "AdjustReservations" 506 for adjusting reservation parameters. In the "AdjustLimit" procedure, the limit parameter of a target VM is increased to be at least as large as the requested allocation. In the "AdjustShares" procedure, the requested resource allocation is first calculated as a fraction of the available parent entitlement. This fraction is then used to determine the amount by which current shares have to be increased. In the "AdjustReservations" procedure, the reservation of the target VM is increased to be at least as large as the requested allocation. Depending on the RP tree hierarchy, these procedures can be also applied to the target VM's parent RP node and other ancestor nodes higher up in the RP tree as necessary.

In the main procedure named "DRMDIAGNOSE" 500, the limit is adjusted first. If the limit cannot be adjusted to a required level, other resources such as the shares and the reservation are adjusted. In particular, for a current node in the resource cluster, the limit, the shares and the reservation are adjusted. Subsequently, for each parent of the current node in the resource pool hierarchy, the limit is adjusted first. If the limit cannot be adjusted to a required level, other resources such as the shares and the reservation are adjusted. The resource allocation diagnosis algorithm iterates for all the nodes in a resource cluster.

In the procedure named "AdjustLimit" 502, if increasing the limit is a restricted action, the recommended action is set to null, a fault is added and a "false" alarm is returned. However, if increasing the limit is not a restricted action, the amount of the limit adjustment, "L," is set to the difference between the required limit and the current limit and the recommended action is expanded to include the increase of the limit.

In the procedure named "AdjustShares" 504, if increasing the shares is a restricted action, the resource allocation diagnosis algorithm returns back to the main procedure named "DRMDIAGNOSE" 500. However, if increasing the shares is not a restricted action, the amount of the shares adjustment is set to a value that satisfies the resource requirements in the resource cluster and the recommended action is expanded to include the increasing of the shares. In particular, for a current node in the resource cluster, the resource reservations of the sibling nodes of the current node is added up to generate an addition result, "r," on line 3 of the procedure and the difference between the limit of the parent node of the current node and the sum of the reservation of the current node and the addition result, "r," is calculated as the potential increase amount ("e") of the resource allocation to the current node on line 4 of the procedure. The fraction of the requested resource allocation over the parent's resource entitlement is then calculated and stored in the variable "s" on line 5 of the procedure. If the potential increase amount "e" is positive, the procedure proceeds to determine the recommended shares increase for the current node. The recommended shares increase is calculated and stored in the variable "L" using the equation provided on line 9 of the procedure. In the equation for "L," the first term in the numerator represents the fraction of the total shares of the parent to be given to the current node while the second term in the numerator represents the current shares allocation to the current node. The difference between these two terms represents the increased number of shares to be allocated to the current node, while the remaining amount of the total shares can be distributed amongst the siblings of the current node. To maintain the current shares allocations to siblings, the value obtained in the numerator is then scaled by the value in the denominator of this equation, i.e. by the value, "1−s." This scaling factor "1−s" corresponds to the fraction of the total shares that is to be given to all the siblings. Subsequently, the amount of the shares adjustment is increased by the value of "L" that satisfies the increased resource request to this current node on line 10 of the procedure.

In the procedure named "AdjustReservations" 506, if increasing the reservation is a restricted action, the resource allocation diagnosis algorithm returns back to the main procedure named "DRMDIAGNOSE" 500. However, if increasing the reservation is not a restricted action, the amount of the reservation adjustment is set to a value that satisfies the resource requirement and the recommended action is expanded to include the increasing of the reservation. In particular, for a current node in the resource cluster, if the current resource allocation is less than the required allocation, the resource reservations of the sibling nodes of the current node is added up to generate an addition result, "r," on line 4 of the procedure. In addition, the difference between the limit of the parent node of the current node and the sum of the reservation of the current node and the addition result, "r," is calculated as the potential increase amount ("e") of the resource allocation to the current node on line 5 of the procedure. The excess reservation needed by the current node is calculated as the difference between the requested allocation and the current allocation for this target VM and is stored in the variable "delta" on line 6 of the procedure. If the potential increase amount "e" is positive and the excess reservation "delta" required is less than "e", the procedure proceeds to add a new recommendation. Subsequently, the amount of the reservation adjustment to the current node is set to the calculated value "delta" on line 8 of the procedure.

Figure 6:
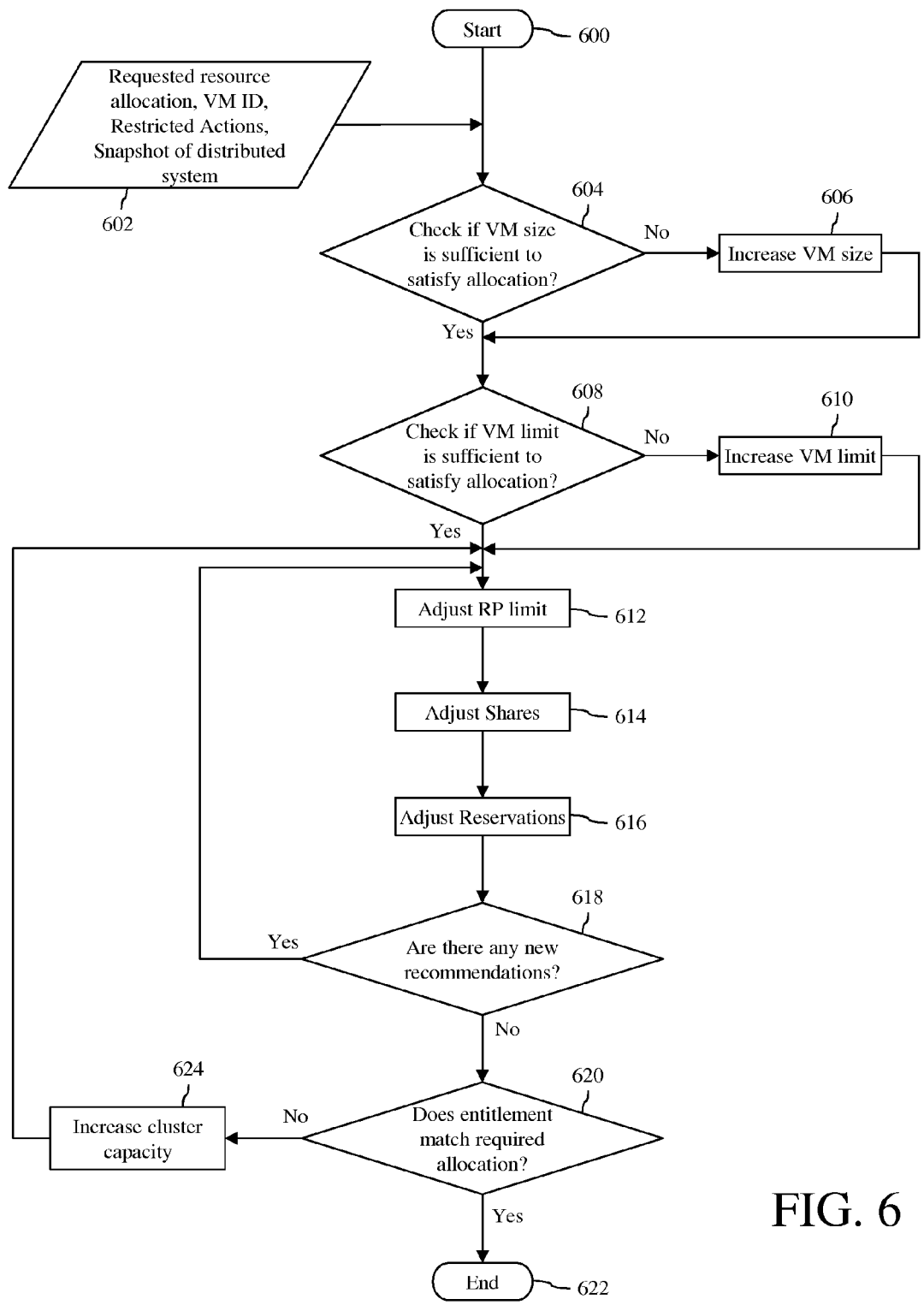
FIG. 6 is a flow chart that illustrates an operation of a resource allocation diagnosis algorithm.

FIG. 6 is a flow chart that illustrates an exemplary operation of a resource allocation diagnosis algorithm used by the resource allocation diagnosis unit 304. The algorithm begins operation, at step 600. The algorithm receives required resource allocations, VM identification (ID), restricted actions, and a snapshot of the cluster configuration, at step 602. The algorithm checks each VM of a RP to be managed to see whether or not the size of the VM is sufficient to satisfy the required resource allocation, at step 604. If the size of each VM is sufficient to satisfy the required resource allocation, the algorithm checks whether or not the limit of the VM is sufficient to satisfy the required resource allocation, at step 608. If the size of a VM is not sufficient to satisfy the required resource allocation, the algorithm increases or recommends increasing the size of the VM, at step 606, and checks the limit of the VM, at step 608. If the limit of each VM is sufficient to satisfy the required resource allocation, the algorithm adjusts or recommends adjusting the limit of the RP, at step 612. If the limit of a VM is not sufficient to satisfy the required resource allocation, the algorithm increases or recommends increasing the limit of the VM, at step 610, and adjusts or recommends adjusting the limit of the RP, at step 612. After the limit of the RP is adjusted to satisfy the required resource allocation, the algorithm adjusts or recommends adjusting the shares of the RP, at step 614, and adjusts or recommends adjusting the reservations of the RP, at step 616. After the shares and the reservations of the RP are adjusted to satisfy the required resource allocation, the algorithm checks whether or not there are new recommendations, at step 618. If there are new recommendations, the algorithm goes back to step 612, and repeats the process of adjusting/recommending adjusting the limit, the shares and the reservations of the RP. If there are no new recommendations, the algorithm checks whether or not the current resource entitlement matches the required resource allocations, at step 620. If the current resource entitlement matches the required resource allocations, the algorithm stops, at step 622. If the current resource entitlement does not match the required resource allocations, the algorithm increases or recommends increasing the capacity of the resource cluster, at step 624. After the capacity of the resource cluster is increased, the algorithm goes back to step 612, and repeats the process of adjusting/recommending adjusting the limit, the shares and the reservations of the RP.

In one embodiment, the resource allocation diagnosis algorithm may find multiple solutions and RLS settings recommendations, which can result in the required allocation for VMs. Some of these solutions may be trivial to find while others may require exhaustive search. In one embodiment, finding such a solution requires traversing higher in the RP tree of a resource cluster and adjusting neighbor resource pools. An example scenario for increasing the resource allocation to a target VM of interest, VM 420-3, of FIG. 4 is described as follows. It may be possible to increase the resource allocation to VM 420-3 by adjusting the reservation, shares or limit parameters of VM 420-3, its parent RP 406 and/or its next higher ancestor RP 404. However, under the condition that RP 406 cannot accommodate this increased resource request, the resource allocation diagnosis algorithm traverses higher up in the RP tree to the sibling RP 408 of the RP 406 and adjust the RLS settings of RP 408 to satisfy the resource allocation to VM 420-3. For example, the RLS settings of RP 408 can be adjusted such that the resource allocation to RP 408 is reduced and excess resource is released to VM 420-3. In one embodiment, the resource allocation diagnosis algorithm takes into account two main factors while searching for a solution. The first factor is that finding a solution should be done in reasonable time and cost, which requires pruning solutions which can only be found deep in the search space. The second factor is that a service provider may restrict adjusting some components of RLS settings. For example, a service provider may prefer increasing the reservation of the VM under consideration over decreasing reservations of other VMs in the resource tree. In this case, the resource allocation diagnosis algorithm prunes solutions that require adjusting those resource settings. In one embodiment, there may be two main reasons why the resource allocation diagnosis algorithm cannot find a set of recommendations of RLS adjustments to reach the requested allocation. The first reason is that the cluster size may be smaller than the sum of the resource requirements. In this case, the resource allocation diagnosis algorithm suggests increasing the cluster capacity. The second reason is that a user may have placed constraints on the resource allocation diagnosis algorithm. For example, a user may restrict the adjusting limits of the VM. In this case, the resource allocation diagnosis algorithm cannot find a solution satisfying this constraint and generates a fault with the reason of the failure.

A usage example of the resource allocation diagnosis algorithm used by the resource allocation diagnosis unit 304 is described as follows. The usage example explores a scenario where an administrator provisions resources to a set of VMs according to standard application recommendations. A later change in the workload behavior necessitates changing the RLS settings of the cluster. In this usage example, VM resource profiles are created in terms of a number of virtual CPUs (vCPUs), CPU allocation (in MHz) and configured memory size (in MB) along with the RLS settings and host profiles in terms of number of physical cores, CPU (MHz) per core, total memory size, power consumption when idle. In addition, the distributed computer system 100 includes two load balanced web servers (WSs) running a web application, a load balancing (LB) server and a database backend (DB) server. The web application requires extra processing power while the database server requires extra memory for in-memory table caches. The administrator encapsulates the resource requirements of the web server VMs by setting up a resource pool for the web server VMs. The request processing of the web servers will not be affected by the other servers' CPU demand. Further, the administrator allocates two physical servers each with dual core 1 GHz CPUs and 2 GB memory each. FIG. 7 shows a table with initial allocation settings for the resource cluster. After deployment, the administrator observes that due to the deviation of the particular workload from the standard workloads, the DB server requires more processing capability while the web servers do not consume more than 60% of the allotted CPU. Consequently, the administrator wishes to increase the CPU capacity of the VM hosting DB server to 1000 MHz. However, manually increasing the CPU reservation of the DB server to 1000 MHz would cause the cluster resource configuration to fail the admission control check because the sum of total CPU reservations would have exceeded the cluster capacity.

After running the resource allocation diagnosis algorithm with the required allocation, the following actions are recommended:

Decrease CPU reservation of RP Web Server Resource Pool (WSRP) by 428 MHz
Decrease CPU reservation of VM LB Server by 71 MHz
Increase CPU reservation of VM DB Server by 1000 MHz The following shows the resulting allocations once these settings are applied.

|  | Resource Allocation | |
| --- | --- | --- |
| VM | CPU (MHz) | Memory (MB) |
| Web Servers (2) | 1286 | 1024 |
| DB server | 1000 | 1695 |
| LB Server | 429 | 353 |

Figure 8:
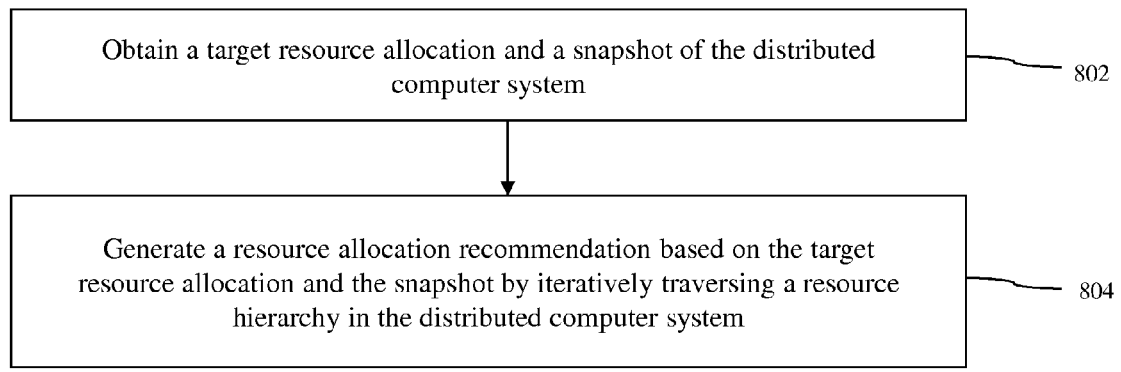
FIG. 8 is a flow diagram of a method for performing a resource allocation diagnosis on a distributed computer system in accordance with an embodiment of the invention.

A method for performing a resource allocation diagnosis on a distributed computer system in accordance with an embodiment of the invention is described with reference to a flow diagram of FIG. 8. At block 802, a target resource allocation and a snapshot of the distributed computer system are obtained, where the snapshot includes configurations and resource usage information of at least some components of the distributed computer system. At block 804, a resource allocation recommendation is generated based on the target resource allocation and the snapshot by iteratively traversing a resource hierarchy in the distributed computer system, where the resource allocation recommendation specifies at least one resource configuration action or at least one capacity expansion action for the distributed computer system to meet the target resource allocation.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing a resource allocation diagnosis for a distributed computer system, the method comprising:
    obtaining a target resource allocation and a snapshot of the distributed computer system, wherein the snapshot includes configurations and resource usage information of at least some components of the distributed computer system;
    generating a resource allocation recommendation based on the target resource allocation and the snapshot by iteratively traversing a resource hierarchy in the distributed computer system, wherein the resource allocation recommendation specifies at least one resource configuration action or at least one capacity expansion action for the distributed computer system to meet the target resource allocation; and
    executing the resource allocation recommendation on the distributed computer system.

2. The method of claim 1, wherein iteratively traversing the resource hierarchy in the distributed computer system comprises:
    analyzing a resource allocation of an entity located at the bottom layer of the resource hierarchy in the distributed computer system; and
    subsequently, analyzing a resource allocation of each parent of the entity in the resource hierarchy.

3. The method of claim 1, wherein the at least one resource configuration action includes changing a priority of a client running on a host computer in the distributed computer system or a resource pool in the distributed computer.

4. The method of claim 3, wherein the client includes a virtual machine.

5. The method of claim 1, wherein the at least one resource configuration action includes changing a minimum amount of resources guaranteed to be available to a client running on a host computer in the distributed computer system or a resource pool in the distributed computer.

6. The method of claim 1, wherein the at least one resource configuration action includes changing an upper bound of resources that can be allocated to a client running on a host computer in the distributed computer system or a resource pool in the distributed computer.

7. The method of claim 1, wherein the at least one capacity expansion action includes adding a physical processor, a physical memory or a host computer in the distributed computer system.

8. The method of claim 1, wherein the snapshot includes configurations of host computers in the distributed computer system and resource usage information of clients running on at least some of the host computers.

9. A non-transitory computer-readable storage medium containing program instructions for performing a resource allocation diagnosis on a distributed computer system, wherein execution of the program instructions by one or more processors causes the one or more processors to perform steps comprising:
    obtaining a target resource allocation and a snapshot of the distributed computer system, wherein the snapshot includes configurations and resource usage information of at least some components of the distributed computer system;
    generating a resource allocation recommendation based on the target resource allocation and the snapshot by iteratively traversing a resource hierarchy in the distributed computer system, wherein the resource allocation recommendation specifies at least one resource configuration action or at least one capacity expansion action for the distributed computer system to meet the target resource allocation; and
    executing the resource allocation recommendation on the distributed computer system.

10. The non-transitory computer-readable storage medium of claim 9, wherein iteratively traversing the resource hierarchy in the distributed computer system comprises:
    analyzing a resource allocation of an entity located at the bottom layer of the resource hierarchy in the distributed computer system; and
    subsequently, analyzing a resource allocation of each parent of the entity in the resource hierarchy.

11. The non-transitory computer-readable storage medium of claim 9, wherein the at least one resource configuration action includes changing a priority of a client running on a host computer in the distributed computer system or a resource pool in the distributed computer.

12. The non-transitory computer-readable storage medium of claim 11, wherein the client includes a virtual machine.

13. The non-transitory computer-readable storage medium of claim 9, wherein the at least one resource configuration action includes changing a minimum amount of resources guaranteed to be available to a client running on a host computer in the distributed computer system or a resource pool in the distributed computer.

14. The non-transitory computer-readable storage medium of claim 9, wherein the at least one resource configuration action includes changing an upper bound of resources that can be allocated to a client running on a host computer in the distributed computer system or a resource pool in the distributed computer.

15. The non-transitory computer-readable storage medium of claim 9, wherein the at least one capacity expansion action includes adding a physical processor, a physical memory or a host computer in the distributed computer system.

16. The non-transitory computer-readable storage medium of claim 9, wherein the snapshot includes configurations of host computers in the distributed computer system and resource usage information of clients running on at least some of the host computers.

17. A computer system for performing a resource allocation diagnosis on a distributed computer system comprising:
   memory; and
   a processor, which when program instructions in the memory are executed, is configured to:
      obtain a target resource allocation and a snapshot of the distributed computer system, wherein the snapshot includes configurations and resource usage information of at least some components of the distributed computer system;
      generate a resource allocation recommendation based on the target resource allocation and the snapshot by iteratively traversing a resource hierarchy in the distributed computer system, wherein the resource allocation recommendation specifies at least one resource configuration action or at least one capacity expansion action for the distributed computer system to meet the target resource allocation; and
      execute the resource allocation recommendation on the distributed computer system.

18. The computer system of claim 17, wherein the processor is further configured to:
   analyze a resource allocation of an entity located at the bottom layer of the resource hierarchy in the distributed computer system; and
   subsequently, analyze a resource allocation of each parent of the entity in the resource hierarchy.

19. The computer system of claim 17, wherein the at least one resource configuration action includes changing a priority of a client running on a host computer in the distributed computer system or a resource pool in the distributed computer.

20. The computer system of claim 19, wherein the client includes a virtual machine.

21. The computer system of claim 17, wherein the at least one resource configuration action includes changing a minimum amount of resources guaranteed to be available to a client running on a host computer in the distributed computer system or a resource pool in the distributed computer.

22. The computer system of claim 17, wherein the at least one resource configuration action includes changing an upper bound of resources that can be allocated to a client running on a host computer in the distributed computer system or a resource pool in the distributed computer.

23. The computer system of claim 17, wherein the at least one capacity expansion action includes adding a physical processor, a physical memory or a host computer in the distributed computer system.

24. The computer system of claim 17, wherein the snapshot includes configurations of host computers in the distributed computer system and resource usage information of clients running on at least some of the host computers.

* * * * *